United States Patent Office 3,586,741
Patented June 22, 1971

3,586,741
MANUFACTURE OF CEMENT AS MELTED FIBERS
Vichtor Immanuel Vognsgaard, Copenhagen-Valby, Denmark, assignor to F. L. Smidth & Co., New York, N.Y.
No Drawing. Filed Feb. 20, 1969, Ser. No. 801,201
Claims priority, application Great Britain, Feb. 28, 1968, 9,427/68
Int. Cl. C04b 7/44
U.S. Cl. 263—53                                        12 Claims

ABSTRACT OF THE DISCLOSURE

A process for the production of hydraulic cement is disclosed in which raw materials are fed dry to a cement kiln in the correct proportions to form cement clinker, the raw materials are burnt, at least the last stage of the burning being at such a high temperature that the burnt product is molten, the product is tapped from the kiln in the form of at least one molten stream, the stream is converted with rapid cooling into the form of fibers of uniform thickness and the fibers are subsequently broken up into cement of the desired fineness.

---

This invention is concerned with processes for the manufacture of hydraulic cement in which the raw materials are burnt in a cement kiln which may be of any kind suitable for the purpose, for example a shaft kiln having a melting hearth at its bottom, or a rotary kiln.

According to the invention, hydraulic cement is produced by a process in which raw materials are fed dry to a cement kiln in the correct proportions to form cement clinker, the raw materials are burnt, at least the last stage of the burning being at such a high temperature that the burnt product is molen, the product is tapped from the kiln in the form of one or more molten streams, the stream or streams are converted with rapid cooling into the form of fibers of uniform thickness and the fibers subsequently broken up into cement of the desired thickness.

The process according to the invention has a number of advantages, both in regard to economy of manufacture and to the quality of the finished product, when compared with conventional methods of cement manufacture. In the first place, the raw materials need not be so finely ground before they are burned. because intimate mixing of the different materials occurs when they become molten. Satisfactory results are obtained if the materials are fed to the kiln in a coarsely crushed state, for example in similar size range to stone clipping as used for road surfacing. The optimum size will depend on the type of kiln being used. In a shaft kiln, for example, allowance must be made for upward flow of hot gases, and a size range of about 1 to 2 inches is most satisfactory; substantially larger material should be avoided because of the danger of loss of homogeneity of the melt. In a rotary kiln, the size of the material is not so critical, the upper limit being determined by the necessity of avoiding mechanical damage to the lining of the kiln. While there is no need to grind the materials finely, part or all of them may be small particle size, and this will frequently be the case when the raw materials are waste products from other industries.

Further advantages are that the disintegrated product is in the form of thin fibers, and these need only be crushed or otherwise broken up, which is much cheaper than the normal grinding of clinker. The raw materials are supplied to the kiln dry, and therefore less heat is required than if the materials were supplied as slurry.

With the melting of the raw materials a large amount of three-calcium silicate, $C_3S$, is formed and, owing to the rapid cooling, the main part of the $C_3S$ compounds will be preserved in the finished cement to help make the cement of high early strength. The rapid cooling will furthermore mean that the crystals formed are small, which also contributes to high early strength, because small particles facilitates the access of water to the individual crystals during the setting of the cement in use.

By means of the invention it is possible to obtain a cement having properties approaching those of a so-called monodisperse cement, that is to say a cement of very uniform particle size, ideally 3 to 6 microns. Such cements are especially suitable for the manufacture of products by moulding in the absence of steam curing, and in general for work requiring rapid setting of the cement. The invention is particularly applicable to the manufacture of Al-cements, which have relatively low melting points, but can also be used for the manufacture of Portland cements and other common types of cements.

Various methods may be used to convert the streams of molten product into fibers. For example, the stream or streams may be directed from the kiln to a so-called spinning device in which they strike rapidly rotating, water-cooled steel wheels, the peripheral speed of which, combined with a powerful, transverse current of air, causes the formation of long, thin fibers. In the preferred method, jets of air or other gas are blown into the molten product, and the stream or streams thereby converted into short fibers.

Preferably the fibers formed by disintegration of the molten product have a uniform thickness approximately equal to the particle cross-section of cement of normal fineness, that is to say about 3 to 6 microns. Subsequently, the fibers formed are broken up into cement of the desired fineness, which means, in effect, breaking up the fibers into small particles having a length of only a few times their thickness. The advantage of cement in the form of such particles is that the time of hydration is effectively the same for all the particles, which results in a cement of high early strength.

The reduction of the fibers to cement fineness may conveniently be effected in a disintegrator, and the finished cement may conveniently be carried out of the disintegrator in a current of air and be separated off in a cyclone. In a conventional type of disintegrator, two discs are mounted on a common axis for rotation, preferably in opposite directions, and a ring of pins is mounted on each disc. The diameter of one ring is larger than that of the other ring, and the pins of the two rings overlap, one ring inside the other, so that material fed to the disintegrator is sheared and broken up by the relative movement of the pins.

I claim:
1. A process for the production of hydraulic cement in which raw materials are fed dry to a cement kiln in the correct proportions to form cement clinker, the raw materials are burnt, at least the last stage of the burning being at such a high temperature that the burnt product is molten, the product is tapped from the kiln in the form of at least one molten stream, the stream or streams are converted with rapid cooling into the form of fibers of uniform thickness and the fibers subsequently broken up into cement of the desired fineness.

2. A process according to claim 1 for the production of an Al-cement.

3. A process according to claim 1 in which the kiln is a shaft kiln, and the raw materials fed to the kiln have a size range of from 1 to 2 inches.

4. A process according to claim 1 in which the stream from the kiln is directed to a spinning device for the formation of long thin fibers.

5. A process according to claim 1 in which jets of gas are blown into the molten product, and the stream is thereby converted into short fibers.

6. A process according to claim 1 in which the fibers formed have a thickness of from 3 to 6 microns.

7. A process according to claim 1 in which the fibers are broken up in a disintegrator.

8. A process according to claim 7 in which the cement is carried out of the disintegrator in a current of air and separated in a cyclone.

9. In a process of cement manufacture, the steps for the production of hydraulic cements, such as Portland cement or Al-cement and the like, comprises taking a quantity of discrete particles of raw material for the production of said cement, melting said materials to form a homogeneous mass, forming fine cement fibers while said material is still in the molten state, solidifying said fibers and disintegrating the fibers to form short particle lengths.

10. A process according to claim 9 wherein said fibers are of a substantially uniform thickness.

11. The process according to claim 9 wherein the short lengths are 2 to 5 times the fiber thickness.

12. The process according to claim 11 which further includes the step of crushing said raw material prior to the melting thereof, and said fibers have a thickness in a size range of 3–6 microns.

References Cited

UNITED STATES PATENTS

| | | | |
|---|---|---|---|
| 2,721,806 | 10/1955 | Oberg et al. | 263—53X |
| 3,346,672 | 10/1967 | Bailey | 263—53 |
| 3,253,936 | 5/1966 | Weindel | 106—64 |
| 3,467,535 | 9/1969 | Myles | 106—64 |

JOHN J. CAMBY, Primary Examiner